(12) United States Patent
Solterbeck

(10) Patent No.: US 10,753,560 B2
(45) Date of Patent: Aug. 25, 2020

(54) STOWABLE SEATING

(71) Applicant: William D. Solterbeck, Hampton, VA (US)

(72) Inventor: William D. Solterbeck, Hampton, VA (US)

( * ) Notice: Subject to any disclaimer, the term of this patent is extended or adjusted under 35 U.S.C. 154(b) by 27 days.

(21) Appl. No.: 16/350,049

(22) Filed: Sep. 20, 2018

(65) Prior Publication Data

US 2019/0082834 A1   Mar. 21, 2019

Related U.S. Application Data

(60) Provisional application No. 62/606,395, filed on Sep. 21, 2017.

(51) Int. Cl.

| | |
|---|---|
| A47B 83/02 | (2006.01) |
| A47B 33/00 | (2006.01) |
| A47C 3/18 | (2006.01) |
| A47C 7/56 | (2006.01) |
| F21S 8/02 | (2006.01) |
| F21V 15/01 | (2006.01) |
| F21V 21/108 | (2006.01) |
| F21V 23/06 | (2006.01) |
| F21V 33/00 | (2006.01) |
| F21V 23/04 | (2006.01) |

(Continued)

(52) U.S. Cl.
CPC .............. *F21S 8/026* (2013.01); *A47B 33/00* (2013.01); *A47B 83/02* (2013.01); *A47B 83/0213* (2017.08); *A47B 83/0215* (2017.08); *A47C 3/18* (2013.01); *A47C 7/563* (2013.01); *F16M 13/027* (2013.01); *F21S 8/065* (2013.01); *F21V 15/01* (2013.01); *F21V 21/108* (2013.01); *F21V 23/045* (2013.01); *F21V 23/0435* (2013.01); *F21V 23/06* (2013.01); *F21V 33/0052* (2013.01); *F21V 33/0056* (2013.01); *F21V 33/0088* (2013.01); *A47B 2051/005* (2013.01); *F21Y 2115/10* (2016.08)

(58) Field of Classification Search
CPC ................ A47B 83/0215; A47B 83/02; A47B 2200/0079
USPC ............................................... 297/143, 157.1
See application file for complete search history.

(56) References Cited

U.S. PATENT DOCUMENTS

| | | | | |
|---|---|---|---|---|
| 396,089 | A | * | 1/1889 | Johnson ................. A47B 83/02 297/157.1 |
| 1,394,405 | A | * | 10/1921 | Brennan ................. A47B 83/02 297/141 |

(Continued)

*Primary Examiner* — David R Dunn
*Assistant Examiner* — Tania Abraham

(57) ABSTRACT

An activities unit combining a table or other horizontal surface with seating units is shown and described. Seating units may include both permanent or fixed individual seating units and also, at least one additional seating unit movable between a stowed position to a deployed position. Both permanent or fixed seating units and also stowable seating units may each be supported on the activities unit by an arm above floor level. This enables ready cleaning of a floor surface on which the unitized table is placed without having to move seating units out of the way. Construction of the unitized table enables utilitarian components and features which may be deemed unsightly to be concealed, for example, by wood paneling both at a table top and also a depending wall. The table top may overhang the depending wall.

17 Claims, 3 Drawing Sheets

(51) Int. Cl.
*F16M 13/02* (2006.01)
*F21S 8/06* (2006.01)
*F21Y 115/10* (2016.01)
*A47B 51/00* (2006.01)

(56) References Cited

U.S. PATENT DOCUMENTS

| | | | | | |
|---|---|---|---|---|---|
| 1,473,975 | A | * | 11/1923 | Reid | A47B 83/02 297/143 |
| 1,860,291 | A | * | 5/1932 | Majcher | A47B 83/02 297/141 |
| 2,382,183 | A | * | 8/1945 | Green | A47B 83/02 297/157.1 |
| 2,821,241 | A | * | 1/1958 | Schwahn | A47D 3/005 297/141 |
| 2,824,598 | A | * | 2/1958 | Ertl | A47C 9/022 297/143 |
| 3,033,614 | A | * | 5/1962 | Pazan | A47C 9/06 297/331 |
| 3,226,154 | A | * | 12/1965 | Carling | A47B 83/02 297/142 |
| 3,547,484 | A | * | 12/1970 | Carling | A47B 83/02 297/141 |
| 3,549,200 | A | * | 12/1970 | Cooper | A47B 39/00 297/158.3 |
| 3,596,985 | A | * | 8/1971 | Degagne | A47B 83/02 297/77 |
| 3,658,379 | A | * | 4/1972 | Black | A47C 9/022 297/157.1 |
| 3,688,419 | A | * | 9/1972 | Woolman | A47B 41/00 434/432 |
| 4,511,177 | A | * | 4/1985 | O'Sullivan | A47D 1/106 297/136 |
| 5,104,183 | A | * | 4/1992 | Madsen | A47C 9/022 297/142 |
| 5,352,014 | A | * | 10/1994 | Allen | A47B 91/02 297/142 |
| 5,673,968 | A | * | 10/1997 | Ponzio | A47C 9/022 297/143 |
| 5,921,622 | A | * | 7/1999 | Newton | A47B 83/02 297/157.1 |
| 6,010,185 | A | * | 1/2000 | Petersen | A47B 37/04 297/158.3 |
| 7,971,930 | B2 | * | 7/2011 | Larsen | A47B 37/04 297/158.3 |
| 8,007,040 | B2 | * | 8/2011 | Krueger | A47B 13/021 297/157.1 |
| 9,635,930 | B2 | * | 5/2017 | Korb | A47B 13/06 |
| 10,278,495 | B2 | * | 5/2019 | Byrne | A47B 83/0213 |
| 2007/0046078 | A1 | * | 3/2007 | Humfeldt | A47B 83/00 297/142 |
| 2010/0320811 | A1 | * | 12/2010 | Lin | A47B 83/0215 297/143 |

\* cited by examiner

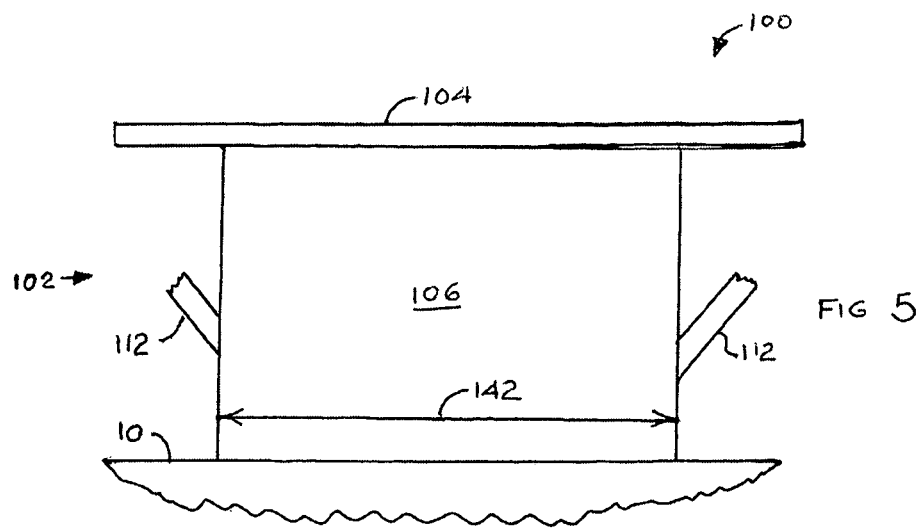

US 10,753,560 B2

STOWABLE SEATING

FIELD OF THE INVENTION

The present invention relates to tables and other items for accommodating activities when a person is seated, and more particularly, to, e.g., a table or other item having at least one seating unit movable between a stowed position and a deployed position.

BACKGROUND OF THE INVENTION

Certain activities such as dining, writing, light assembly of articles and other work tasks, and others are typically performed with a person seated at a horizontal surface on which may be placed items to support the activity. Frequently, such activities utilize free standing table type furniture such as desks, tables and counters. Chairs may be provided to accommodate the person in a seated position.

In some applications, the table type furniture may be sized and configured to accommodate a number of users. An appropriate number of chairs may be brought to the table type furniture to seat the users.

In some applications, it may be desirable to provide a table and a number of seats as a unit, such as with outdoor picnic table and bench assemblies. For some activities, such as meals for a plurality of people, it may be preferable to provide individual seats rather than grouped seating such as benches. There may also be a need to vary the number of individual seats.

There remains a need for unitized table and seating devices which can provide individual seating units and which can vary the number of seating units.

SUMMARY OF THE INVENTION

The present invention addresses the above stated needs by providing a unitized table and seating device providing both permanent or fixed individual seating units and also, at least one additional seating unit movable between a stowed position to a deployed position.

Both permanent or fixed seating units and also stowable seating units may be supported on the unitized table by an arm above floor level. This enables ready cleaning of a floor surface on which the unitized table is placed without having to move seating units out of the way.

Construction of the unitized table enables utilitarian components and features which may be deemed unsightly to be concealed. Notably, the unitized table may include a perimetric wall depending from the table top and extending to the floor. Optionally, the perimetric wall may widen at a base of greater footprint area than the perimetric wall. The table top, perimetric wall, and base may be covered in wood displaying natural wood grain for enhanced aesthetics.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 5 is a diagrammatic side elevational view of an activities unit according to still further aspects of the invention, wherein FIGS. 1-5 each show limited aspects of the invention, with some components omitted from each view to preserve clarity of the respective view.

DETAILED DESCRIPTION

Figure 2:
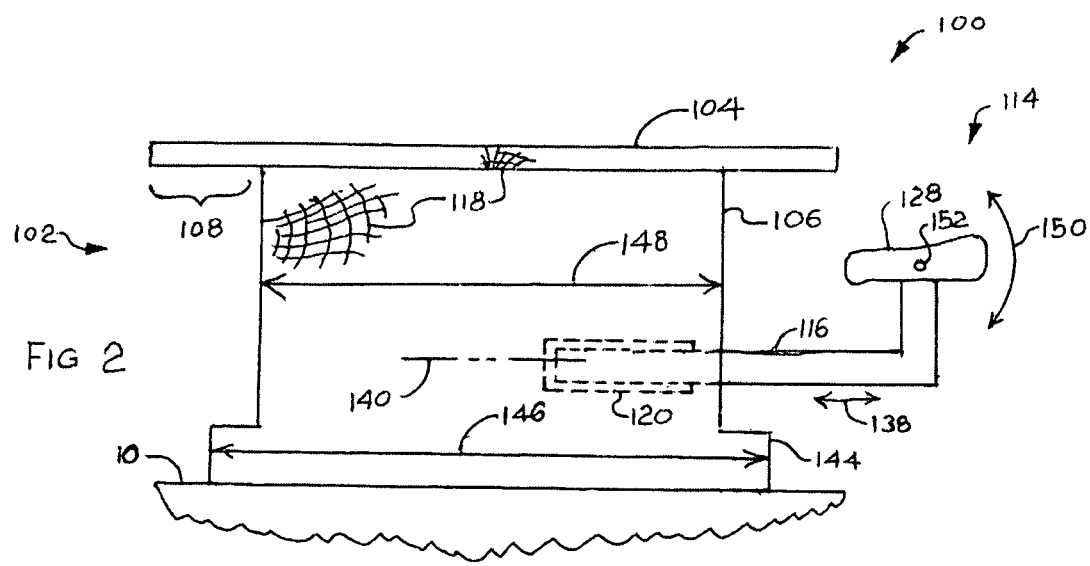
FIG. 2 is a diagrammatic side elevational view of an activities unit according to at least one additional aspect of the invention.
Figure 1:
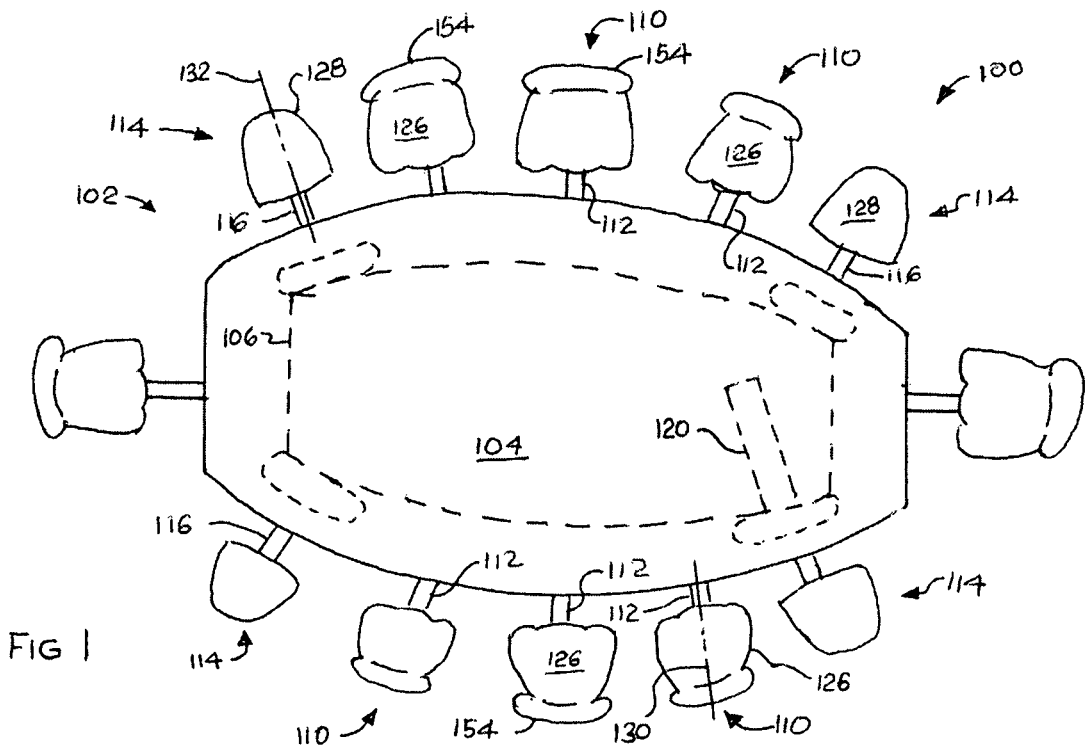
FIG. 1 is a diagrammatic top plan view of an activities unit according to at least one aspect of the invention.

Referring first to FIG. 1, according to at least one aspect of the invention, there is shown an activities unit 100 for use on a floor 10 (see FIG. 2). Activities unit 100 may comprise in combination a table 102 comprising a table top 104 and a perimetric wall 106 coupled to and depending from table top 104. Table top 104 may have an overhang portion 108 extending outside perimetric wall 106.

At least one permanent seating unit 110 may be immovably coupled to table 102 out of contact with floor 10 when activities unit 100 is in an operable orientation on floor 10. Permanent seating unit 110 may include a permanent seating unit support arm 112 spanning and connecting a respective permanent seating unit 110 with table 102. At least one stowable seating unit 114 and a stowable seating unit support arm 116 retractably coupling at least one stowable seating unit 114 to table 102.

The at least one permanent seating unit 110 explicitly contemplates a plurality of permanent seating units 110, as seen in FIG. 1. Alternatively, activities unit 100 may comprise a plurality of stowable seating units 114 each including a stowable seating unit support arm 116 retractably coupling a respective one said stowable seating unit 116 to table 102, in the absence of a permanent seating unit 110.

It should be noted that where a plurality of similar components such as permanent and stowable seating units 110, 114 are present, not every one of such components are called out by reference numeral. It will be understood that unnumbered components drawn similarly to numbered components are additional examples of the numbered components.

Overhang portion 108 is an optional feature typically provided for dining tables for example. To this end, use of the term "may" will be understood that the referenced item is explicitly contemplated as potentially being omitted or substituted by other items. Overhang portion 108 may extend about an entire periphery of table 102, as shown in FIG. 1, or alternatively, may exist only at limited portions of table 102. For example, where activities unit 100 has significant length compared to width, overhang portion 108 may be limited to extending along the width (this option is not shown).

Permanent seating units 110, depicted herein as individual chairs or seats, are permanently fixed to table 102 in only one position or location relative to table top 104. Because permanent seating units 110 are coupled to table 102 by permanent seating unit support arms 112 out of contact with floor 10, operations such as sweeping and vacuum cleaning floor 10 may be performed without moving any chairs or seats.

Perimetric wall 106 provides at a minimum an aesthetic feature concealing certain utilitarian components of table 102 from external view, and may also provide a utilitarian function such as being a structural member of table 102 and providing support surfaces for other components. As seen in FIG. 2, table top 104 and perimetric wall 106 may present wood grain 118 to view at exterior surfaces of table 102. Wood grain 118 is generally held to provide a pleasing appearance to furniture, and in particular, suggests potentially expensive and exclusive wooden construction of furniture. Table top 104 and perimetric wall 106 cover and conceal from view non-circular sockets 120, to be described hereinafter, and other utilitarian components of activities unit 100 which may be deemed aesthetically unappealing. These characteristics enable activities unit 100 to be utilized as a residential or commercial dining table, as an elegant desk or other furniture including a horizontal working surface, and as other items where enhanced appearance is desired.

It should be noted at this point that orientational terms such as vertical and horizontal refer to the subject drawing as viewed by an observer. The drawing figures depict their subject matter in orientations of normal use, which could obviously change with changes in posture and position of the novel activities unit 100. Therefore, orientational terms must be understood to provide semantic basis for purposes of description, and do not limit the invention or its component parts in any particular way.

Figure 3:
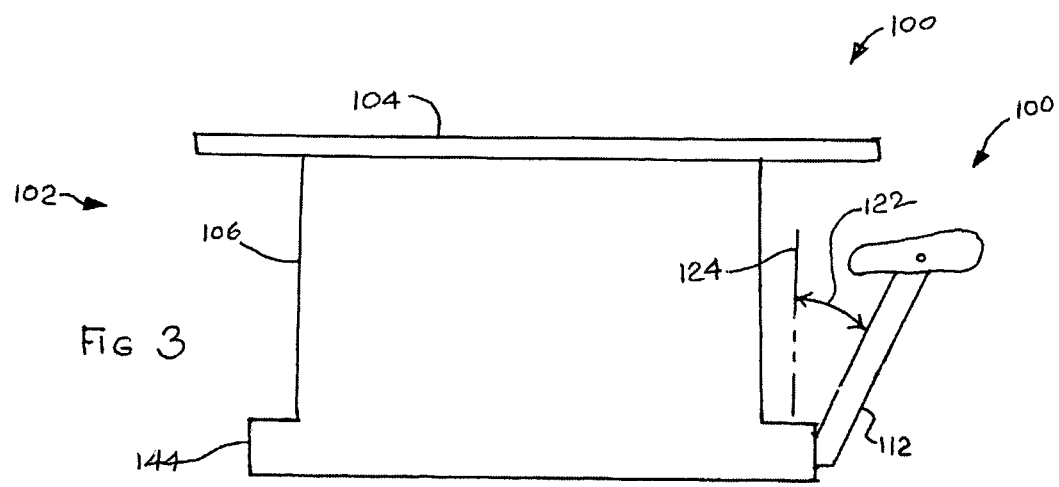
FIG. 3 is a diagrammatic side elevational view of an activities unit according to further aspects of the invention.

In an embodiment illustrated in FIG. 3, each permanent seating unit support arm 112 is oriented at an angular deviation 122 from a vertical direction 124 of less than forty-five degrees when activities unit 100 is in an operable orientation placed on floor 10 as depicted in FIG. 2. This arrangement enables a user (not shown) of activities unit 100 to seat himself or herself without undue effort of avoiding or climbing over permanent seating unit support arm 112. Stowable seating units 114 may be provided with the same feature.

Referring specifically to FIG. 2, as with permanent seating units 110, at least one stowable seating unit 114 is coupled to table 102 out of contact with floor 10 by a respective one stowable seating unit support arm 116. Hence access to floor 10 for cleaning is not obstructed by stowable seating units 114.

Permanent seating units 110 each include a seat element 126 and are each secured to table 102 solely by one elongate member (e.g., permanent seating support arm 112) spanning a respective seat (e.g., seat element 126) of a permanent seating unit 110 and table 102. The one elongate member may be laterally centered relative to seat element 126.

Similarly, each one of the at least one stowable seating unit 114 may include a seat element 128 and may be secured to table 120 solely by one elongate member (e.g., stowable seating unit support arm 116) spanning the seat element 128 of each stowable seating unit 114 and table 102. The one elongate member may be laterally centered relative to seat element 128.

Lateral centering of the various elongate members and their respective permanent or stowable seating units 110 or 114 is shown in FIG. 1. Seat element 126 of permanent seating unit 110 is bisected by a longitudinal axis 130 of permanent seating unit support arm 112. Similarly, seat element 128 of stowable seating unit 114 is bisected by a longitudinal axis 132 of stowable seating unit support arm 116.

As shown in FIG. 2, each elongate member (e.g., stowable seating unit support arm 116) spanning a respective seat 128 and table 102 comprises non-circular socket 120 supported within perimetric wall 106 of table 102 and non-circular tubing telescopically and non-rotatably received relative to non-circular socket 120. In this example, stowable seating unit support arm 116 comprises non-circular tubing. The elongate member need not be of similar configuration as its surrounding non-circular socket 120. For example, non-circular socket 120 could be triangular, with corresponding stowable seating unit support arm 116 being hexagonal (this option is not shown). It is merely necessary that sufficient points of contact between non-circular socket 120 and stowable seating unit support arm 116 be provided to constrain the latter to be telescopically slidable yet unable to rotate about longitudinal axis 132.

Figure 4:
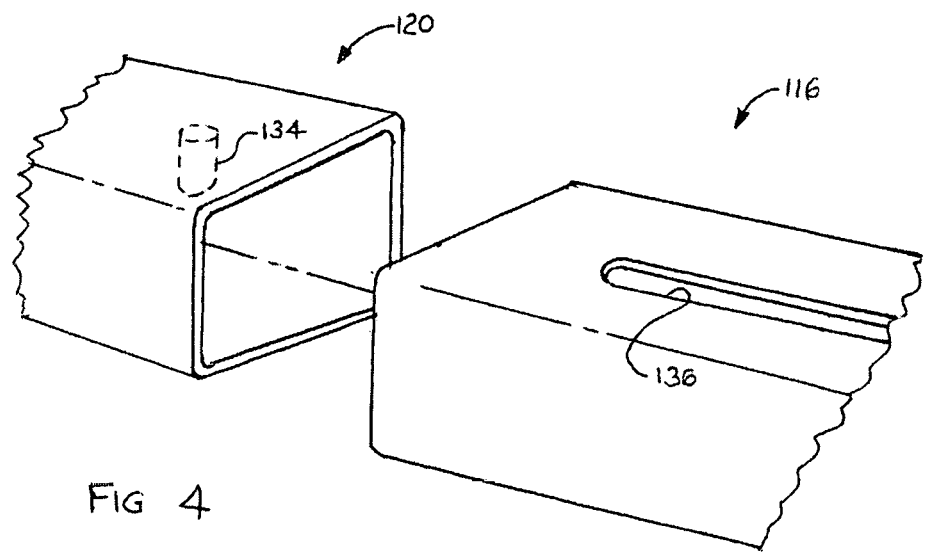
FIG. 4 is a perspective detail view of components shown at the right of FIG. 1, the right of FIG. 2, and the lower right of FIG. 3.

Turning now to FIG. 4, stowable seating unit support arm 116 and its anchorage using non-circular socket 120 may further comprise a stop limiting projection of the non-circular tubing from non-circular socket 120. In this example, the stop may comprise a pin 134 fixed to non-circular socket 120 and arranged to occupy a slot 136 in stowable seating unit support arm 116. Slot 136 is dimensioned and configured to enable telescopic adjustment of stowable seating support arm 116 along non-circular socket 120. An example of such motion is depicted in FIG. 2, wherein stowable seating support arm 116 moves along axis 140 of non-circular socket 120 in directions called out by arrow 138. Pin 134 is omitted from FIG. 2 for clarity of the view.

Referring to FIG. 5, an only portion of activities unit 100 contacting floor 10 is limited to a footprint of perimetric wall 106. Alternatively stated, that portion of activities unit 100 contacting floor 10 is coextensive with a lateral dimension 142 of perimetric wall 106.

Referring again to FIGS. 2 and 3, as an alternative to the embodiment of FIG. 5, activities unit 100 may further comprise a base 144 having a footprint area greater than a footprint of perimetric wall 106. The footprint area of base 144 is greater than the footprint area of perimetric wall 106 when a transverse dimension 146 of base 144 is greater than a parallel transverse dimension 148 of bounds of perimetric wall 106. Base 144 may be provided to enhance stability of table 102, to enhance aesthetics of table 102, and for other reasons.

Where base 144 is provided, the only portion of activities unit 100 contacting floor 10 may be limited to a footprint of base 144. Limiting contact of activities unit 100 with floor 10 makes tasks such as sweeping and vacuum cleaning easier.

Returning now to FIG. 2, in an embodiment, at least one of the at least one stowable seating unit 114 can pivot on the elongate member to adjust attitude of a seating surface of stowable seating unit 114. For example, seat element 128 may pivot as indicated by arrow 150 about a pivot pin 152 projecting from or anchored to stowable seating unit support arm 116. Using the same pivot pin 152, and with additional reference to FIG. 1, at least one of the at least one stowable seating unit 114 can pivot on the elongate member such that a seating surface (e.g., of seat element 128) of stowable seating unit 114 can be parallel to and flush with perimetric wall 106 in a stowed position. The stowed position for each stowable seating unit 114 is indicated in broken lines in FIG. 1, with seat element 128 shown tilted about ninety degrees from the horizontal position depicted in FIG. 2. The deployed position of each stowable seating unit 114 is shown in solid lines in FIGS. 1 and 2.

In the embodiment of FIG. 2, the at least one stowable seating unit 114 moves horizontally when moving between the stowed position and the deployed position when activities unit 100 is in an operable orientation as illustrated in FIGS. 1 and 2.

In an embodiment, and as illustrated in FIG. 1, permanent seating units 110 are dissimilarly configured relative to stowable seating units 114. Notably, at least some of permanent seating units 110 include respective seatbacks 154. By contrast, stowable seating units 114 have no seat backs. Dissimilarity may of course be based on other characteristics. Seat elements 126 and 128 may be dissimilar. In an example, seat elements 126 may be substantially square in top plan view, with seat elements 128 being significantly wider at a front edge than at an opposed rear edge (or vice versa).

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. An activities unit for use on a floor, the activities unit comprising in combination:
   a table comprising a table top and a perimetric wall coupled to and depending from the table top, the table top having an overhang portion extending outside the perimetric wall;
   at least one permanent seating unit immovably coupled to the table out of contact with the floor when the activities unit is in an operable orientation on the floor, each said permanent seating unit including a permanent seating unit support arm spanning and connecting a respective permanent seating unit with the table; and
   at least one stowable seating unit and a stowable seating unit support arm retractably coupling the at least one stowable seating unit to the table.

2. The activities unit of claim 1, wherein each said permanent seating unit support arm is oriented at an angular deviation from a vertical direction of less than forty-five degrees when the activities unit is in an operable orientation.

3. The activities unit of claim 1, wherein the at least one stowable seating unit is coupled to the table out of contact with the floor by a respective one stowable seating unit support arm.

4. The activities unit of claim 1, wherein the permanent seating units each include a seat element and are each secured to the table solely by the permanent seating unit support arm, the latter spanning a respective seat element of the seating unit and the table, the permanent seating unit support arm laterally centered relative to the seat element.

5. The activities unit of claim 1, wherein each one of the at least one stowable seating unit includes a seat element and is secured to the table solely by the permanent seating unit support arm, the latter spanning the seat element of each said stowable seating unit and the table, the permanent seating unit support arm laterally centered relative to the seat element.

6. The activities unit of claim 5, wherein each elongate member spanning a respective seat element and the table comprises a non-circular socket supported within the perimetric wall of the table and non-circular tubing telescopically and non-rotatably received relative to the non-circular socket.

7. The activities unit of claim 6, wherein the table top and the perimetric wall cover and conceal from view the non-circular sockets.

8. The activities unit of claim 7, wherein the table top and the perimetric wall include wood grain on their exterior surfaces.

9. The activities unit of claim 6, further comprising a stop limiting projection of the non-circular tubing from the non-circular socket.

10. The activities unit of claim 1, wherein the only portion of the activities unit contacting the floor is limited to a footprint of the perimetric wall.

11. The activities unit of claim 1, further comprising a base having a footprint area greater than a footprint of the perimetric wall.

12. The activities unit of claim 11, wherein the only portion of the activities unit contacting the floor is limited to a footprint of the base.

13. The activities unit of claim 1, wherein at least one of the at least one stowable seating unit can pivot on the elongate member to adjust attitude of a seating surface of the stowable seating unit.

14. The activities unit of claim 13, wherein at least one of the at least one stowable seating unit can pivot on the elongate member such that a seating surface of the stowable seating unit can be parallel to and flush with the perimetric wall.

15. The activities unit of claim 1, wherein the at least one stowable seating unit moves horizontally when moving between a stowed position and a deployed position when the activities unit is in an operable orientation.

16. The activities unit of claim 1, wherein at least some of the permanent seating units include respective seatbacks.

17. The activities unit of claim 1, wherein the permanent seating units are dissimilarly configured relative to the stowable seating units.

\* \* \* \* \*